US010690028B2

(12) United States Patent
Kayama et al.

(10) Patent No.: US 10,690,028 B2
(45) Date of Patent: Jun. 23, 2020

(54) ABNORMALITY DETECTION DEVICE FOR ENGINE SYSTEM DETECTING AN ABNORMALITY IN A FUEL VAPOR PIPE

(71) Applicant: DENSO CORPORATION, Kariya, Aichi-pref. (JP)

(72) Inventors: Ryozo Kayama, Kariya (JP); Masanori Kurosawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 146 days.

(21) Appl. No.: 15/765,785

(22) PCT Filed: Sep. 26, 2016

(86) PCT No.: PCT/JP2016/078198
§ 371 (c)(1),
(2) Date: Apr. 4, 2018

(87) PCT Pub. No.: WO2017/064997
PCT Pub. Date: Apr. 20, 2017

(65) Prior Publication Data

US 2018/0306074 A1 Oct. 25, 2018

(30) Foreign Application Priority Data

Oct. 13, 2015 (JP) ................................ 2015-202070

(51) Int. Cl.
*G01M 15/04* (2006.01)
*F01M 13/04* (2006.01)
(Continued)

(52) U.S. Cl.
CPC ............ *F01M 13/04* (2013.01); *F01M 13/00* (2013.01); *F02D 35/00* (2013.01); *F02D 41/22* (2013.01);
(Continued)

(58) Field of Classification Search
CPC .............. F02D 41/22; F02D 2041/224; F02M 25/0809; F02M 25/0827; F01M 2013/027
(Continued)

(56) References Cited

U.S. PATENT DOCUMENTS 4,967,717 A 11/1990 Miyazaki et al.
5,317,909 A 6/1994 Yamada et al.
(Continued)

FOREIGN PATENT DOCUMENTS

JP 2010-255469 11/2010
JP 2011-52627 3/2011
JP 2013-117175 6/2013

*Primary Examiner* — Eric S. McCall
(74) *Attorney, Agent, or Firm* — Nixon & Vanderhye P.C.

(57) ABSTRACT

An abnormality detection device for an engine system detects an abnormality in a fuel vapor pipe connected to an intake pipe of an engine at a portion upstream of a supercharger in a flow direction of intake air. The abnormality detection device includes an intake air temperature sensor and an abnormality detection portion. The intake air temperature sensor is fitted to the intake pipe on an upstream side of the supercharger in the flow direction of intake air and detects a temperature of intake air mixed with fuel vapor introduced into the intake pipe from the fuel vapor pipe. The abnormality detection portion detects an abnormality in the fuel vapor pipe according to a detection value of intake air detected by the intake air temperature sensor.

5 Claims, 4 Drawing Sheets

(51) Int. Cl.

| | |
|---|---|
| ***F01M 13/00*** | (2006.01) |
| ***F02D 41/22*** | (2006.01) |
| ***F02M 25/08*** | (2006.01) |
| ***F02D 35/00*** | (2006.01) |
| *F01M 13/02* | (2006.01) |
| *F02D 41/00* | (2006.01) |

(52) U.S. Cl.
CPC .... *F02M 25/0827* (2013.01); *F02M 25/0854* (2013.01); *F02M 25/0872* (2013.01); *F01M 2013/027* (2013.01); *F02D 41/0032* (2013.01); *F02D 2200/0414* (2013.01); *F02D 2250/08* (2013.01); *F02M 25/0836* (2013.01)

(58) Field of Classification Search
USPC .......................................... 73/114.38, 114.39
See application file for complete search history.

(56) References Cited

U.S. PATENT DOCUMENTS

| | | | | |
|---|---|---|---|---|
| 2014/0330482 | A1* | 11/2014 | Yang | G07C 5/00 701/34.4 |
| 2015/0345435 | A1* | 12/2015 | Yang | F02M 25/0809 123/520 |
| 2016/0153384 | A1* | 6/2016 | Ulrey | F02D 41/3082 123/464 |

* cited by examiner

ABNORMALITY DETECTION DEVICE FOR ENGINE SYSTEM DETECTING AN ABNORMALITY IN A FUEL VAPOR PIPE

CROSS REFERENCE TO RELATED APPLICATION

This application is the U.S. national phase of International Application No. PCT/JP2016/078198 filed Sep. 26, 2016, which designated the U.S. and claims priority to Japanese Patent Application No. 2015-202070 filed on Oct. 13, 2015, the entire contents of each of which are hereby incorporated herein by reference.

TECHNICAL FIELD

The present disclosure relates to an abnormality detection device for an engine system detecting an abnormality in a fuel vapor pipe.

BACKGROUND ART

A device introducing unburned fuel vapor into an intake pipe of an engine is adopted in the related art to improve fuel consumption of the engine. For example, in a device described in Patent Literature 1, fuel vapor generated in a fuel tank is trapped temporarily in a canister. The fuel vapor trapped in the canister is forced out from the canister and introduced into the intake pipe by a negative pressure which develops in the intake pipe when intake air in the engine flows the intake pipe. The device described in Patent Literature 1 detects an internal pressure of the fuel tank and also detects an abnormality in an introduction pathway of fuel vapor including the canister according to a detection value of the internal pressure.

PRIOR ART LITERATURES

Patent Literature

Patent Literature 1: JP 4-318268 A

SUMMARY OF INVENTION

A vehicle equipped with a supercharger in enhancing an engine output becomes popular. In an engine equipped with a supercharger, a positive pressure develops in an intake pipe on a downstream side of the supercharger in a flow direction of intake air while the supercharger is driven. Hence, in order to introduce fuel vapor from the fuel vapor pipe into the intake pipe by a negative pressure developing in the intake pipe, the fuel vapor pipe needs to be connected to the intake pipe at a portion upstream of the supercharger in the flow direction of intake air. According to the configuration as above, however, when an abnormality occurs in a portion where the intake pipe and the fuel vapor pipe are connected, such as disconnection of the fuel vapor pipe from the intake pipe, fuel vapor in the fuel vapor pipe may possibly be released into air. In addition, when the fuel vapor pipe leaks or clogs, fuel vapor in the fuel vapor pipe may possibly be released into air as well.

An object of the present disclosure is to provide an abnormality detection device for an engine system capable of detecting an abnormality in a fuel vapor pipe.

An abnormality detection device for an engine system according to an aspect of the present disclosure detects an abnormality in a fuel vapor pipe connected to an intake pipe of an engine at a portion upstream of a supercharger in a flow direction of intake air. The abnormality detection device includes an intake air temperature sensor and an abnormality detection portion. The intake air temperature sensor is fitted to the intake pipe on an upstream side of the supercharger in the flow direction of intake air and detects a temperature of intake air mixed with fuel vapor introduced into the intake pipe from the fuel vapor pipe. The abnormality detection portion detects an abnormality in the fuel vapor pipe according to a detection value of intake air detected by the intake air temperature sensor.

According to the configuration as above, when fuel vapor is hardly introduced into the intake pipe from the fuel vapor pipe due to an abnormality in the fuel vapor pipe, fuel vapor hardly mixes with intake air. In a case where a temperature of fuel vapor is higher than a temperature of intake air, a temperature of intake air rises when fuel vapor mixes with intake air. Hence, when fuel vapor hardly mixes with intake air due to an abnormality in the fuel vapor pipe, a temperature of intake air drops from a temperature when the fuel vapor pipe is normal. Accordingly, by detecting a temperature of intake air mixed with fuel vapor by using the intake air temperature sensor as in the configuration described above, an abnormality in the fuel vapor pipe can be detected according to a detection value of intake air.

DESCRIPTION OF EMBODIMENTS

First Embodiment

Hereinafter, a first embodiment of an abnormality detection device for an engine system will be described. Firstly, an outline of the engine system of a vehicle of the present embodiment will be described with reference to FIG. 1.

Figure 1:
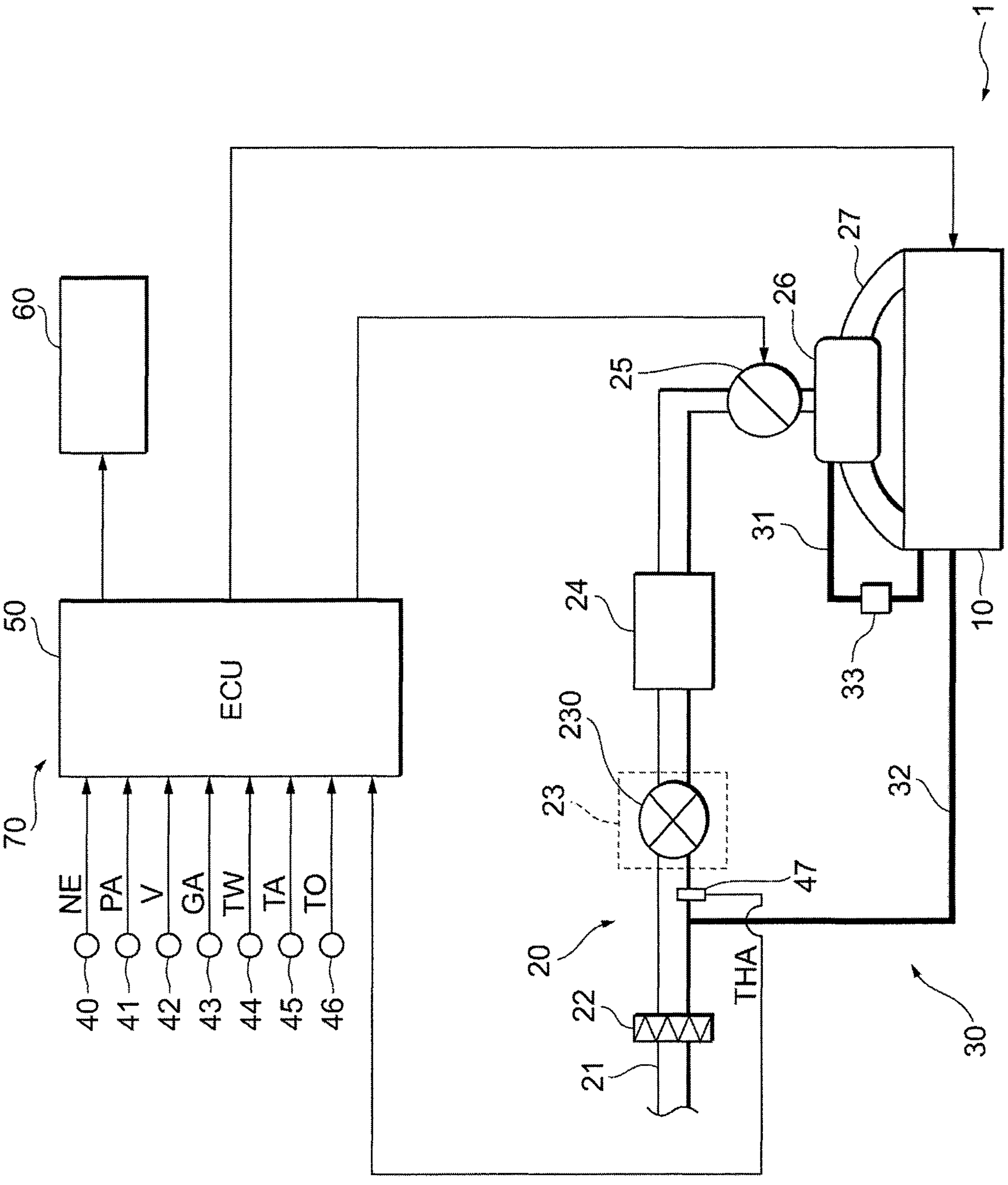
FIG. 1 is a block diagram schematically showing an engine system of a first embodiment.

As is shown in FIG. 1, an engine system 1 of the present embodiment has an engine 10, an intake system 20, and a PCV (Positive Crankcase Ventilation) system 30.

The engine 10 has multiple unillustrated cylinders. Intake air is introduced into the respective cylinders from the intake system 20 and fuel is also injected into the respective cylinders via unillustrated corresponding fuel injection valves. Intake air and fuel mix with each other and an air-fuel mixture is generated in the respective cylinders. Power of the engine 10 is obtained by letting the air-fuel mixture burn in the respective cylinders. Power of the engine 10 is transmitted to drive wheels of the vehicle via an unillustrated crankshaft and used to run the vehicle.

The intake system 20 is a portion which supplies the respective cylinders of the engine 10 with intake air. The intake system 20 has an intake pipe 21, an air element 22, a supercharger 23, an intercooler 24, a throttle valve 25, a surge tank 26, and an intake manifold 27.

The intake pipe 21 is formed of a tube-shaped member defining an inner channel. The intake pipe 21 forces air in from outside the vehicle and introduces the intake air into the surge tank 26. The intake pipe 21 is fitted with the air element 22, the supercharger 23, the intercooler 24, and the throttle valve 25 in the order of description from upstream to downstream in a flow direction of intake air.

The air element 22 is formed of a filter member filtering out foreign matter in the intake air flowing the intake pipe 21. After the foreign matter is filtered out by the air element 22, the intake air flows into the supercharger 23.

The supercharger 23 compresses the intake air which has passed through the air element 22. To be more specific, the supercharger 23 has a compressor 230 disposed in the intake pipe 21, and an unillustrated turbine disposed in an exhaust pipe of the engine 10. The turbine rotates when exhaust air flows the exhaust pipe. The turbine is coupled to the compressor 230 via an unillustrated shaft. That is, a rotational force of the turbine is transmitted to the compressor 230 via the shaft. The compressor 230 draws in intake air flowing the intake pipe 21 and compresses the intake air by rotating with a rotational force transmitted from the turbine via the shaft. The intake air compressed in the compressor 230 flows into the intercooler 24.

The intercooler 24 cools the intake air which is compressed in the supercharger 23 and becomes hot.

The throttle valve 25 operates in association with an operation on an unillustrated accelerator pedal and adjusts a channel area in the intake pipe 21. An amount of air introduced into the intake pipe 21 from outside the vehicle, that is, an amount of intake air is adjusted by adjusting the channel area in the intake pipe 21 with the throttle valve 25.

The surge tank 26 is connected to a downstream end of the intake pipe 21 in the flow direction of intake air. The surge tank 26 is a portion where intake air flowing the intake pipe 21 is temporarily held to reduce pulsation of the intake air. The intake air held in the surge tank 26 is supplied to the respective cylinders via the intake manifold 27 connected to the respective cylinders.

In the engine 10, an air-fuel mixture in a combustion chamber may possibly leak into a crankcase from a clearance between an unillustrated piston of each piston and the cylinder. Fuel vapor so-called a blow-by gas is generated when the leaked air-fuel mixture mixes with engine oil in the crankcase. The blow-by gas accumulated in the crankcase causes deterioration of hydraulic oil of the engine, corrosion of metal, and so on. In order to eliminate such an inconvenience, the PCV system 30 is provided to the engine system 1 with an aim of returning a blow-by gas generated in the engine 10 to the intake pipe 21 or the surge tank 26. The PCV system 30 has a first PCV pipe 31 and a second PCV pipe 32. In the present embodiment, the first PCV pipe 31 corresponds to a recirculation pipe and the second PCV pipe 32 to a fuel vapor pipe. Hereinafter, the blow-by gas is referred to as fuel vapor for ease of description.

The first PCV pipe 31 is formed of a tube-shaped member defining an inner channel. One end of the first PCV pipe 31 is connected to the unillustrated crankcase of the engine 10. The other end of the first PCV pipe 31 is connected to the surge tank 26. That is, the first PCV pipe 31 allows the crankcase of the engine 10 and the surge tank 26 to communicate with each other. A PCV valve 33 is fitted to the first PCV pipe 31 at a midpoint. The PCV valve 33 is a differential valve operated to adjust a degree of opening by itself in response to a difference between an internal pressure of the surge tank 26 and an internal pressure of the crankcase of the engine 10. Owing to an adjustment of a degree of opening of the PCV valve 33, not only a back-flow of intake air from the surge tank 26 into the crankcase of the engine 10 can be prevented, but a flow rate of fuel vapor introduced into the surge tank 26 from inside the crankcase is also adjusted.

The second PCV pipe 32 is formed of a tube-shaped member defining an inner channel. One end of the second PCV pipe 32 is connected to the crankcase of the engine 10. The other end of the second PCV pipe 32 is connected to the intake pipe 21 at a portion downstream of the air element 22 in the flow direction of intake air and upstream of the supercharger 23 in the flow direction of intake air.

When a degree of opening of the throttle valve 25 is small, a negative pressure develops in the surge tank 26. In the PCV system 30 in such a circumstance, fuel vapor is introduced into the surge tank 26 from inside the crankcase of the engine 10 via the first PCV pipe 31 and the crankcase is ventilated because the intake air in the intake pipe 21 is introduced into the crankcase of the engine 10 via the second PCV pipe 32.

The throttle valve 25 opens more as a degree of opening of the accelerator pedal increases. Then, the supercharger 23 is actuated and the intake air is compressed. Eventually, a positive pressure develops in the surge tank 26. In such a circumstance, a pressure is applied also to the first PCV pipe 31 and a degree of opening of the PCV valve 33 decreases. Hence, a positive pressure is applied also to an inner space of the crankcase of the engine 10. Meanwhile, due to an intake air drawing force of the supercharger 23, a negative pressure develops in the intake pipe 21 at a portion upstream of the supercharger 23 in the flow direction of intake air. The fuel vapor is forced out from inside the crankcase of the engine 10 and introduced into the intake pipe 21 via the second PCV pipe 32 by the negative pressure.

An electrical configuration of the engine system 1 will now be described.

The engine system 1 is provided with various sensors to detect an operation amount on the vehicle by a driver and a running state of the engine 10. The engine system 1 is provided with, for example, a rotation speed sensor 40, an accelerator opening sensor 41, a vehicle speed sensor 42, an intake air amount sensor 43, a coolant temperature sensor 44, a throttle opening sensor 45, an oil temperature sensor 46, and an intake air temperature sensor 47.

The rotation speed sensor 40 detects a rotation speed of the crankshaft as an output shaft of the engine 10 (engine rotation speed NE) and outputs a detection signal corresponding to the detected engine rotation speed NE. The accelerator opening sensor 41 detects a depression amount of the accelerator pedal (accelerator pedal depression amount PA) of the vehicle and outputs a detection signal corresponding to the detected accelerator pedal depression amount PA. The vehicle speed sensor 42 detects a vehicle traveling speed (vehicle speed V) and outputs a detection signal corresponding to the detected vehicle speed V. The intake air amount sensor 43 detects a flow rate of intake air (intake air amount GA) supplied from outside the vehicle to the intake pipe 21 and outputs a detection signal corresponding to the detected intake air amount GA. The coolant temperature sensor 44 detects a temperature of a coolant (coolant temperature TW) of the engine 10 and outputs a detection signal corresponding to the detected coolant temperature TW. The throttle opening sensor 45 detects a degree of opening of the throttle valve 25 (throttle opening degree) and outputs a detection signal corresponding to the detected throttle opening degree TA. The oil temperature 46 detects a temperature of hydraulic oil (oil temperature TO) of the engine 10 and outputs a signal corresponding to the detected oil temperature TO.

The intake air temperature sensor 47 is fitted to the intake pipe 21 on an upstream side of the supercharger 23 in the flow direction of intake air. To be more specific, the intake air temperature sensor 47 is fitted to the intake pipe 21 at a portion where the intake pipe 21 and the second PCV pipe 32 are connected. The intake air temperature sensor 47 detects a temperature of intake air mixed with fuel vapor introduced into the intake pipe 21 from the second PCV pipe 32 (intake air temperature THA) and outputs a detection signal corresponding to the detected intake air temperature THA.

The engine system 1 includes an ECU 50 driving the engine 10 and the throttle valve 25 under control. More specifically, the ECU 50 acquires information on the engine speed NE, the accelerator pedal depression amount PA, the vehicle speed V, the intake air amount GA, the coolant temperature TW, the throttle opening degree TA, the oil temperature TO, and the intake air temperature THA according to detections signals from the sensors 40 through 47, respectively. The ECU 50 performs controls, such as a fuel injection control and an ignition timing control, on the engine 10 according to, for example, the engine rotation speed NE, the accelerator pedal depression amount PA, the intake air amount GA, the coolant temperature TW, and the throttle opening degree TA. Also, the ECU 50 performs a throttle opening control to adjust a degree of opening of the throttle valve 25 according to the accelerator pedal depression amount PA.

The ECU 50 detects an abnormality in the second PCV pipe 32 according to the information detected by the respective sensors 40 through 47. An abnormality of the second PCV pipe 32 includes pipe disconnection, leakage, clogging, and so on. Pipe disconnection is an abnormality that occurs when the second PCV pipe 32 connected to the intake pipe 21 comes off the connected portion. Leakage is an abnormality that occurs when a hole opens in the second PCV pipe 32 for some reason and fuel vapor flowing inside the second PCV pipe 32 flows out from the hole. Clogging is an abnormality that occurs when fuel vapor flowing from the second PCV pipe 32 to the intake pipe 21 is blocked by foreign matter deposited in the second PCV pipe 32. Any of the foregoing abnormalities possibly causes fuel vapor flowing inside the second PCV tube 32 to be released to air. To forestall such an inconvenience, the ECU 50 notifies the driver of the vehicle of an abnormality in the second PCV pipe 32 by means of a notification device 60 upon detection of the abnormality. The notification device 60 may be, for example, a warning light provided to an instrument panel of the vehicle.

As has been described above, the ECU 50, the sensors 40 through 47, and the notification device 60 together form an abnormality detection device 70 in the present embodiment. The ECU 50 corresponds to an abnormality detection portion.

A procedure of abnormality detection processing for the second PCV pipe 32 performed by the ECU 50 will now be described in detail with reference to FIG. 2.

Figure 2:
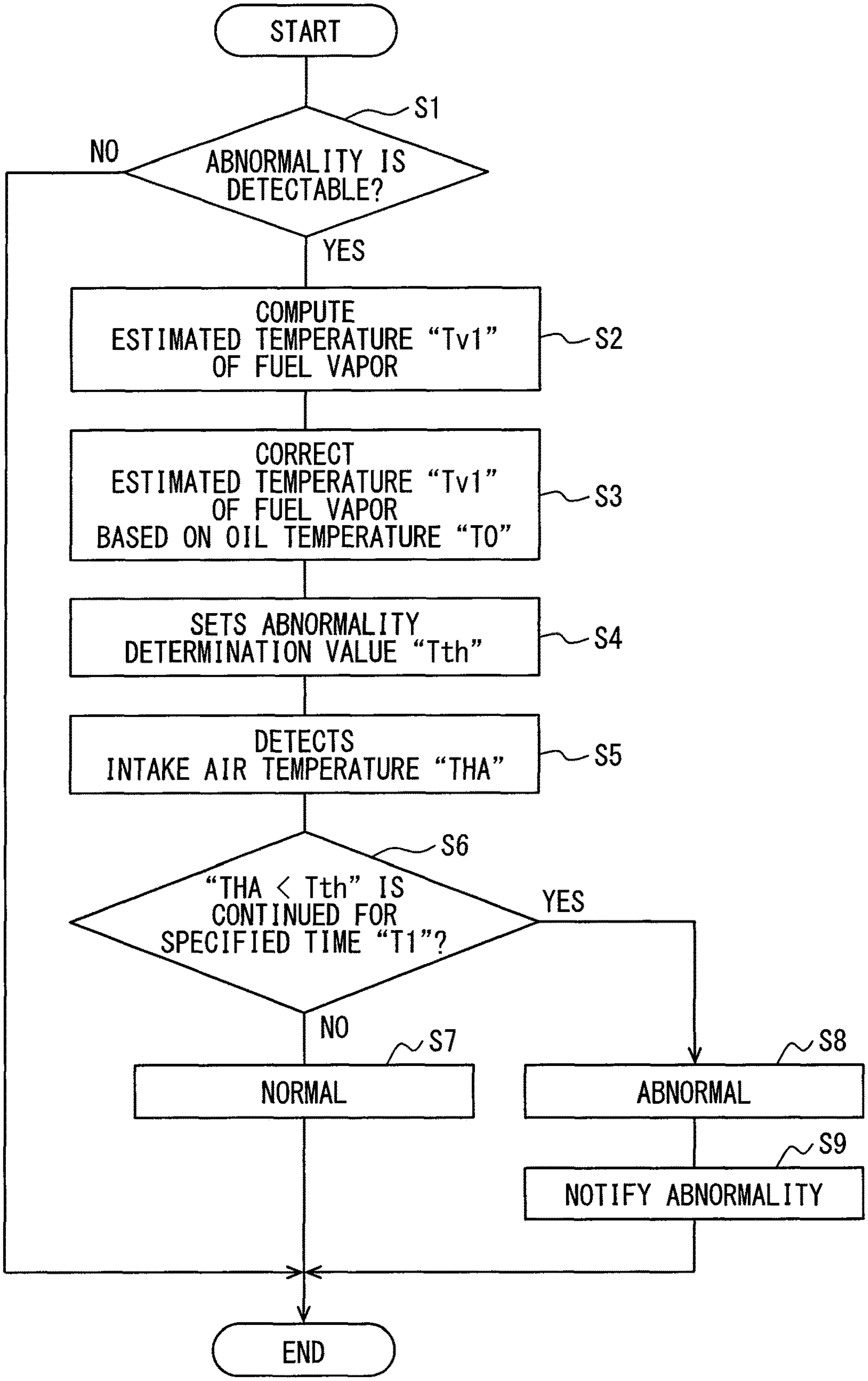
FIG. 2 is a flowchart depicting a procedure of abnormality detection processing performed by an abnormality detection device in the engine system of the first embodiment.

As is depicted in FIG. 2, the ECU 50 first determines whether it is a circumstance where an abnormality in the second PCV pipe 32 is detectable as processing in Step S1. In the present embodiment, an abnormality in the second PCV pipe 32 is detectable when a temperature of fuel vapor introduced into the intake pipe 21 from the second PCV pipe 32 is higher than a temperature of intake air flowing the intake pipe 21 on an upstream side of the portion where the intake pipe 21 and the second PCV pipe 32 are connected. In other words, an abnormality in the second PCV pipe 32 is detectable when a temperature of fuel vapor is higher than a temperature of intake air containing no fuel vapor. The ECU 50 determines whether a temperature of fuel vapor is higher than a temperature of intake air containing no fuel vapor according to a state quantity of the engine 10. The ECU 50 determines that a temperature of fuel vapor is higher than a temperature of intake air containing no fuel vapor when any one of conditions (a1) through (a4) as follows is satisfied:

(a1) a pressure of intake air compressed in the supercharger 23 is at or above a predetermined value;

(a2) the coolant temperature TW is as high as or higher than a predetermined temperature;

(a3) a predetermined time has elapsed after the engine 10 is started; and (a4) the throttle opening degree TA is not less than a predetermined degree of opening.

That is, the ECU 50 determines that it is a circumstance where an abnormality in the second PCV pipe 32 is detectable because, for example, any one of the conditions (a1) through (a4) above is satisfied. In a case where a negative determination is made by the processing in Step S1, the ECU 50 ends a series of processing steps.

In a case where a positive determination is made by the processing in Step S1, the ECU 50 computes an estimated temperature Tv1 of fuel vapor as processing in subsequent Step S2. To be more specific, the ECU 50 computes the estimated temperature Tv1 of fuel vapor according to the state quantity of the engine 10. Examples of the state quantity of the engine 10 include the engine rotation speed NE, a load state of the engine 10, and the intake air amount GA. The load state of the engine 10 can be found according to the engine speed NE, the accelerator pedal depression amount PA, the vehicle speed V, and so on. The ECU 50 has a map indicating a relationship between the state quantity of the engine 10, for example, the engine rotation speed NE, and the estimated temperature Tv1 of fuel vapor, and computes the estimated temperature Tv1 of fuel vapor from the state quantity of the engine 10 by referring to the map.

The ECU 50 corrects the estimated temperature Tv1 of fuel vapor according to the oil temperature TO as processing in Step S3 following Step S2, because a temperature of fuel vapor is also susceptible to a temperature of hydraulic oil of the engine 10. The ECU 50 computes a correction coefficient according to, for example, the oil temperature TO, and computes a corrected, estimated temperature Tv2 of fuel vapor by multiplying the estimated temperature Tv1 of fuel vapor computed in Step S2 by the correction coefficient. Herein, the ECU 50 has a map indicating a relationship between the oil temperature TO and a correction coefficient and computes a correction coefficient from the oil temperature TO by referring to the map. Alternatively, the ECU 50 computes a correction value according to the oil temperature TO, and computes the corrected, estimated temperature Tv2 of fuel vapor by adding the correction value to the estimated temperature Tv1 of fuel vapor computed in Step S2. Herein, the ECU 50 has a map indicating a relationship between the oil temperature TO and a correction value and computes a correction value from the oil temperature TO by referring to the map.

The ECU 50 sets an abnormality determination value Tth according to the corrected, estimated temperature Tv2 of fuel vapor as processing in Step S4 following Step S3. More specifically, the ECU 50 has a map indicating a relationship between the corrected, estimated temperature Tv2 of fuel vapor and the abnormality determination value Tth and computes the abnormality determination value Tth from the corrected, estimated temperature Tv2 of fuel vapor by referring to the map. The abnormality detection value Tth is preliminarily set by a test or the like to take a value not greater than a detection value of the intake temperature THA detected by the intake air temperature 47 while the second PCV pipe 32 is normal and to take a value greater than a detection value of the intake temperature THA in the event of an abnormality in the second PCV pipe 32.

The ECU 50 detects the intake air temperature THA by means of the intake air temperature 47 as processing in Step S5 following Step S4 and determines whether a detection value of the intake air temperature THA remains smaller than the abnormality detection value Tth for a predetermined time T1 as processing in subsequent Step S6. In a case where a negative determination is made by the processing in Step S6, the ECU 50 determines that the second PCV pipe 32 is normal as processing in Step S7 and ends a series of the processing steps.

In a case where a positive determination is made by the processing in Step S6, the ECU 50 determines that the second PCV pipe 32 is abnormal as processing in Step S8 and notifies the driver of the abnormality by means of the notification device 60 as processing in Step S9.

An example of an operation of the abnormality detection device 70 of the present embodiment will now be described.

Figure 3:
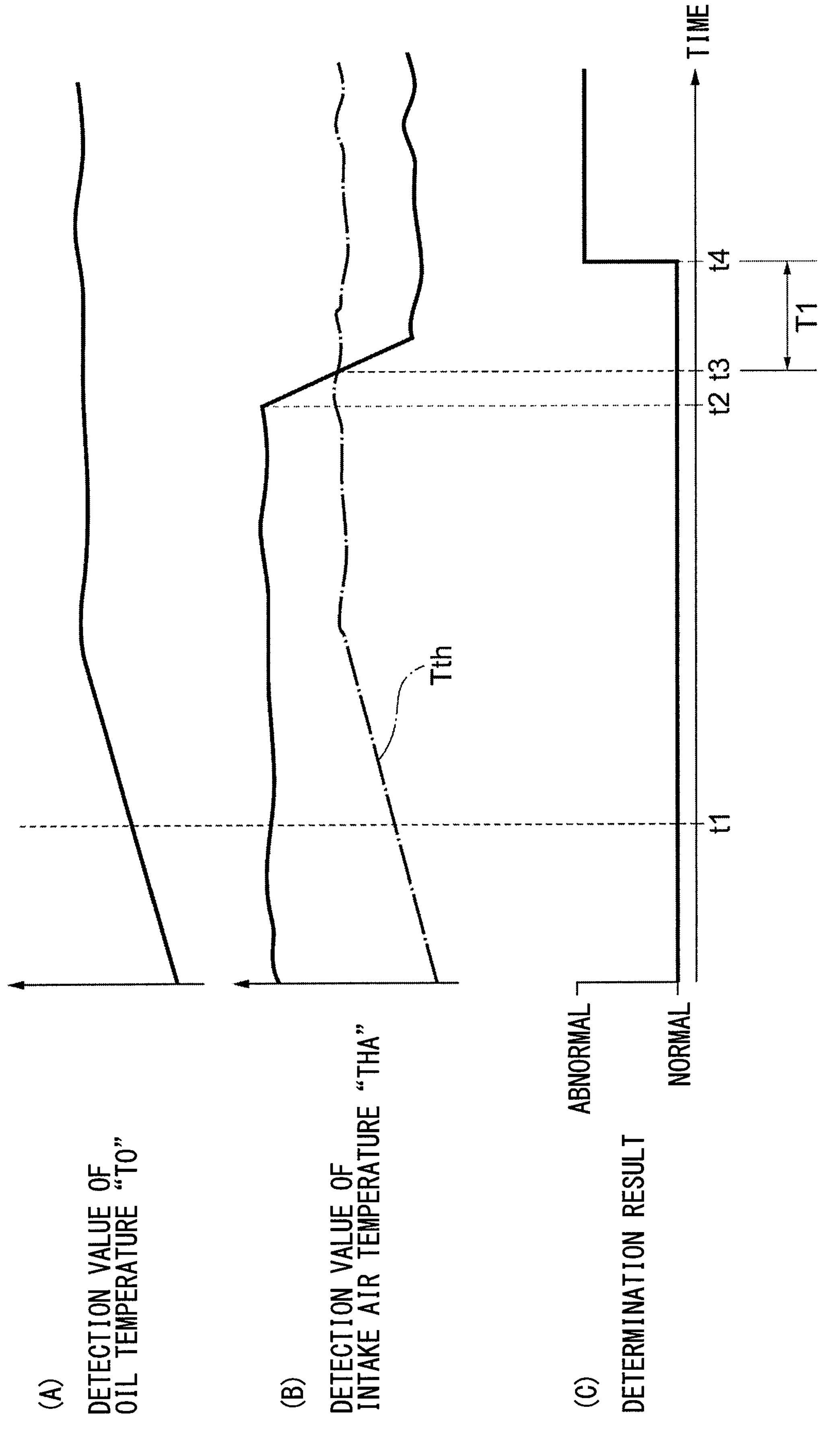
FIGS. 3(A) to 3(C) are timing charts indicating changes in detection value of an oil temperature, in detection value of an intake air temperature, and in determination result of an ECU, respectively, in the abnormality detection device of the first embodiment.

Given that, as is shown in FIG. 3, an abnormality occurs in the second PCV pipe 32 at a time t2 in a circumstance where an abnormality in the second PCV pipe 32 is detectable at and after a time t1. Then, hot fuel vapor is hardly introduced into intake air, and as is indicated by a solid line in FIG. 3(B), a detection value of the intake air temperature THA starts to drop at the time t2 or subsequent time.

Meanwhile, as is indicated by an alternate long and short dash line in FIG. 3(B), the abnormality determination value Tth changes by following a change in the oil temperature TO indicated in FIG. 3(A). As is indicated in FIG. 3(B), a detection value of the intake air temperature THA remains greater than the abnormality determination value Tth before the time t2, that is, while the second PCV pipe 32 is normal. The intake air temperature THA takes a value smaller than the abnormality determination value Tth after the time t2, that is, after an abnormality occurs in the second PCV pipe 32. When a detection value of the intake air temperature THA becomes smaller than the abnormality determination value Tth at a time t3 as is shown in FIG. 3(B) and remains smaller for the predetermined time T1, the ECU 50 detects an abnormality in the second PCV pipe 32 at a time t4 after an elapse of the predetermined time T1 from the time t3 as is shown in FIG. 3(C). Upon detection of an abnormality in the second PCV pipe 32 at the time t4, the ECU 50 notifies the abnormality by means of the notification device 60.

According to the abnormality detection device 70 of the present embodiment described above, functions and effects set forth in the following (1) through (4) can be obtained.

(1) The intake air temperature sensor 47 is fitted to the intake pipe 21 on an upstream side of the supercharger 23 in the flow direction of intake air and detects a temperature of intake air mixed with fuel vapor introduced into the intake pipe 21 from the second PCV pipe 32. The ECU 50 detects an abnormality in the second PCV pipe 32 according to a detection value of the intake air temperature THA detected by the intake air temperature sensor 47. Owing to the configuration as above, an abnormality in the second PCV pipe 32 can be detected.

(2) The ECU 50 computes the estimated temperature Tv1 of fuel vapor according to the state quantity of the engine 10 and also sets the abnormality determination value Tth according to the computed, estimated temperature Tv1 of fuel vapor. The ECU 50 detects an abnormality in the second PCV pipe 32 by comparing a detection value of the intake air temperature THA and the abnormality detection value Tth. Owing to the configuration as above, an abnormality in the second PCV pipe 32 can be detected without having to use a sensor which directly detects a temperature of fuel vapor. Hence, a configuration of the abnormality detection device 70 can be simpler by omitting the sensor.

(3) The ECU 50 corrects the estimated temperature Tv1 of fuel vapor according to the oil temperature TO and also sets the abnormality determination value Tth according to the corrected, estimated temperature Tv2 of fuel vapor. Owing to the configuration as above, a temperature of fuel vapor can be estimated at a higher degree of accuracy. Consequently, detection accuracy of an abnormality in the second PCV pipe 32 can be enhanced.

(4) The intake air temperature sensor 47 is fitted to the intake pipe 21 at a portion where the intake pipe 21 and the second PCV pipe 32 are connected. Owing to the configuration as above, the intake air temperature THA, which is a temperature of intake air mixed with fuel vapor, can be detected at a higher degree of accuracy by the intake air temperature sensor 47. Consequently, detection accuracy of an abnormality in the second PCV pipe 32 can be enhanced.

Second Embodiment

A second embodiment of the abnormality detection device for an engine system will now be described. The following will chiefly describe a difference from the first embodiment above.

Figure 4:
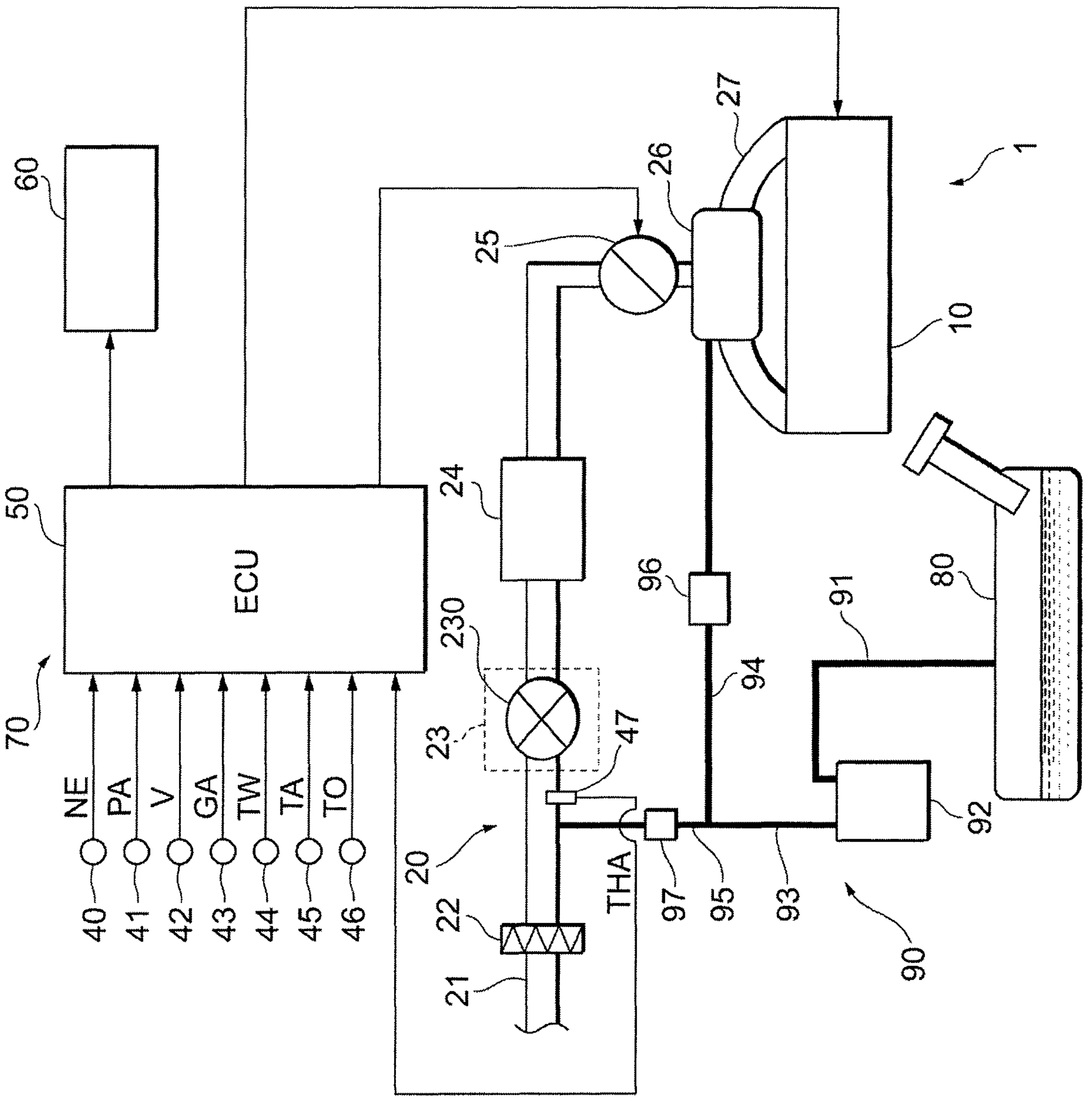
FIG. 4 is a block diagram schematically showing an engine system of a second embodiment.

As is shown in FIG. 4, an engine system 1 of the present embodiment includes an evaporation gas supply system 90 instead of the PCV system 30. The evaporation gas system 90 is a portion introducing an evaporation gas, which is gaseous fuel generated in a fuel tank 80 of a vehicle, into an intake pipe 21 or a surge tank 26. The fuel tank 80 is a portion where liquid fuel of an engine 10 is stored. Hereinafter, an evaporation gas is referred to as fuel vapor for ease of description. The evaporation gas supply system 90 includes a communication pipe 91, a canister 92, and a purge pipe 93. In the present embodiment, the purge pipe 93 corresponds to a fuel vapor pipe.

The communication pipe 91 is formed of a tube-shaped member defining an inner channel. The communication pipe 91 is connected to the fuel tank 80 at one end and to the canister 92 at the other end. In short, the fuel tank 80 and the canister 92 are coupled to each other via the communication pipe 91.

The canister 92 is a portion where fuel vapor generated in the fuel tank 80 is trapped. To be more specific, an absorbent material, such as activated carbon, is provided in the canister 92. In the canister 92, fuel vapor is trapped by the absorbent material.

The purge pipe 93 is formed of a tube-shaped member defining an inner channel. One end of the purge pipe 93 is connected to the canister 92. The other end of the purge pipe 93 is split into a first purge pipe 94 and a second purge pipe 95.

An end of the first purge pip 94 is connected to the surge tank 26. A first purge valve 96 is fitted to the first purge pipe 94 at a midpoint. The first purge valve 96 is a differential valve operated to open and close by itself in response to a difference between an internal pressure of the surge tank 26 and an internal pressure of the purge pipe 93.

An end of the second purge pipe 95 is connected to the intake pipe 21 at a portion downstream of an air element 22 in a flow direction of intake air and upstream of a supercharger 23 in the flow direction of intake air. A second purge valve 97 is fitted to the second purge pipe 95 at a midpoint. The second purge valve 97 is a differential valve operated to open and close by itself in response to a difference between an internal pressure of the intake pipe 21 and an internal pressure of the purge pipe 93.

In the evaporation gas supply system 90, fuel vapor generated when fuel evaporates in the fuel tank 80 is introduced into the canister 92 via the communication pipe 91 and trapped in the canister 92. The fuel vapor trapped in the canister 92 is forced out from inside the canister 92 and introduced into the surge tank 26 or the intake pipe 21 when a negative pressure develops in the surge tank 26 or the intake pipe 21.

For example, when a degree of opening of a throttle valve 25 is small, a negative pressure develops both in the intake pipe 21 and the surge tank 26. In such a circumstance, both of the first purge valve 96 and the second purge valve 97 open. Accordingly, the fuel vapor trapped in the canister 92 is introduced into the surge tank 26 via the purge pipe 93 and the first purge pipe 94 and also into the intake pipe 21 via the purge pipe 93 and the second purge pipe 95.

The throttle valve 25 opens more as a degree of opening of an accelerator pedal increases. Then, the supercharger 23 is actuated and intake air is compressed. Eventually, a positive pressure develops in the surge tank 26. In such a circumstance, the first purge valve 96 closes while the second purge valve 97 opens. Accordingly, the fuel vapor trapped in the canister 92 is introduced into the intake pipe 21 via the purge pipe 93 and the second purge pipe 95 by a negative pressure developing in the intake pipe 21 due to an intake air drawing force of the supercharger 23.

In the present embodiment, an intake air temperature sensor 47 is fitted to the intake pipe 21 at a portion where the intake pipe 21 and the second purge pipe 95 are connected. The intake air temperature sensor 47 detects an intake air temperature THA, which is a temperature of intake air mixed with fuel vapor introduced into the intake pipe 21 from the second purge pipe 95, and outputs a detection signal corresponding to the detected intake air temperature THA to the ECU 50.

In the present embodiment, the ECU 50 performs abnormality detection processing depicted in FIG. 2 as processing to detect an abnormality in the second purge pipe 95.

According to an abnormality detection device 70 of the present embodiment as described above, functions and effects set forth in the following (5) through (8) can be obtained.

(5) The intake air temperature sensor 47 is fitted to the intake air pipe 21 on an upstream side of the supercharger 23 in the flow direction of intake air and detects a temperature of intake air mixed with fuel vapor introduced into the intake air pipe 21 from the second purge pipe 95. The ECU 50 detects an abnormality in the second purge pipe 95 according to a detection value of the intake air temperature THA detected by the intake air temperature sensor 47. Owing to the configuration as above, an abnormality in the second purge pipe 95 can be detected.

(6) The ECU 50 computes an estimated temperature Tv1 of fuel vapor according to a state quantity of an engine 10 and also sets an abnormality determination value Tth according to the computed, estimated temperature Tv1 of fuel vapor. The ECU 50 detects an abnormality in the second purge pipe 95 by comparing a detection value of the intake air temperature THA and the abnormality determination value Tth. Owing to the configuration as above, an abnormality in the second purge pipe 95 can be detected without having to use a sensor which directly detects a temperature of fuel vapor. Hence, a configuration of the abnormality detection device 70 can be simpler by omitting the sensor.

(7) The ECU 50 corrects the estimated temperature Tv1 of fuel vapor according to an oil temperature TO and also sets the abnormality determination value Tth according to a corrected, estimated temperature Tv2 of fuel vapor. Owing to the configuration as above, a temperature of fuel vapor can be estimated at a higher degree of accuracy. Consequently, detection accuracy of an abnormality in the second purge pipe 95 can be enhanced.

(8) The intake air temperature sensor 47 is fitted to the intake pipe 21 at a portion where the intake pipe 21 and the second purge pipe 95 are connected. Owing to the configuration as above, the intake air temperature THA, which is a temperature of intake air mixed with fuel vapor, can be detected at a higher degree of accuracy by the intake air temperature sensor 47. Consequently, detection accuracy of an abnormality in the second purge pipe 95 can be enhanced.

Other Embodiments

In the respective embodiments above, the ECU 50 corrects the estimated temperature Tv1 of fuel vapor according to the oil temperature TO. However, a correction according to the oil temperature TO may be omitted in a case where computation accuracy of the estimated temperature Tv1 of fuel vapor can be ensured without a correction according to the oil temperature TO. In short, the processing in Step S3 of FIG. 2 may be omitted.

In the first embodiment above, the abnormality detection device 70 adopts a method of computing the estimated temperature Tv1 of fuel vapor according to the state quantity of the engine 10. However, instead of the method as above, the abnormality detection device 70 may adopt a method of directly detecting a temperature of fuel vapor flowing the second PCV 32 by using a sensor and setting the abnormality determination value Tth according to the detected temperature of fuel vapor. Likewise, in the second embodiment above, the abnormality detection device 70 may adopt a method of directly detecting a temperature of fuel vapor flowing the second purge pipe 95 by using a sensor and setting the abnormality determination value Tth according to the detected temperature of fuel vapor.

In the first embodiment above, the ECU 50 adopts a method of computing the estimated temperature Tv1 of fuel vapor. However, instead of the method as above, the ECU 50 may adopt a method of computing an estimated temperature of intake air containing fuel vapor. In such a case, the ECU 50 computes an estimated temperature of intake air containing fuel vapor according to the state quantity of the engine 10. Subsequently, the ECU 50 computes a deviation between the computed, estimated temperature of intake air and a detection value of the intake air temperature THA detected by the intake air temperature sensor 47 and may determine an abnormality in the second PDV pipe 32 when an absolute value of the deviation is equal to or greater than a predetermined value. Similar processing can be applied to the ECU 50 in the second embodiment, too.

In the first embodiment, the intake air temperature sensor 47 is not necessarily fitted to the intake pipe 21 at a portion where the intake pipe 21 and the second PCV pipe 32 are connected and a location can be changed as needed. It is only necessary to fit the intake air temperature sensor 47 to the intake pipe 21 on an upstream side of the supercharger 23 in the flow direction of intake air where the intake air temperature sensor 47 is capable of detecting a temperature of intake air mixed with fuel vapor introduced into the intake pipe 21 from the second PCV pipe 32. Likewise, it is only necessary in the second embodiment above to fit the intake air temperature sensor 47 to the intake air pipe 21 on an upstream side of the supercharger 23 in the flow direction of intake air where the intake air temperature 47 is capable of detecting a temperature of intake air mixed with fuel vapor introduced into the intake pipe 21 from the second purge pipe 95.

The determination processing in Step S6 of FIG. 2 may be performed by omitting a condition that a detection value of the intake air temperature THA remains smaller than the abnormality determination value Tth for the predetermined time T1 and may be performed merely to determine whether a detection value of the intake air temperature THA is smaller than the abnormality determination value Tth.

Means or functions or both provided by the ECU 50 can be provided by software stored in a tangible storage device and a computer running the software, software alone, hardware alone, or a combination of the foregoing. For example, when the ECU 50 is provided by hardware in the form of an electronic circuit, the ECU 50 can be provided by a digital circuit including many logic circuits or an analog circuit.

The present discourse is not limited to the specific examples described above. The specific examples modified in design by anyone skilled in the art are also within the scope of the present disclosure as long as a resulting modification has the characteristics of the present disclosure. Respective elements included in each specific example, locations, conditions, shapes, and so on of the elements are not limited to what have been specified in the description above and can be changed as needed. A combination of elements of the respective specific examples can be changed as needed unless a technical contradiction arises.

The invention claimed is:

1. An abnormality detection device for an engine system detecting an abnormality in a fuel vapor pipe connected to an intake pipe of an engine at a portion upstream of a supercharger in a flow direction of intake air, comprising:

an intake air temperature sensor fitted to the intake pipe on an upstream side of the supercharger in the flow direction of intake air and detecting a temperature of intake air mixed with fuel vapor introduced into the intake pipe from the fuel vapor pipe; and an abnormality detection portion detecting an abnormality in the fuel vapor pipe according to a detection value of the intake air detected by the intake air temperature sensor, wherein the abnormality detection portion computes an estimated temperature of the fuel vapor introduced into the intake pipe from the fuel vapor pipe according to a state quantity of the engine, the abnormality detection portion sets an abnormality determination value according to the estimated temperature of the fuel vapor, and the abnormality detection portion detects an abnormality in the fuel vapor pipe by comparing the detection value of the intake air with the abnormality determination value.

2. The abnormality detection device for an engine system according to claim 1, wherein:

the fuel vapor pipe is a recirculation pipe introducing fuel vapor generated in the engine into the intake pipe.

3. The abnormality detection device for an engine system according to claim 1, wherein:

the fuel vapor pipe is a purge pipe introducing fuel vapor generated in a fuel tank where liquid fuel is stored into the intake pipe.

4. The abnormality detection device for an engine system according to claim 1, wherein:

the abnormality detection portion corrects the estimated temperature of the fuel vapor according to a temperature of hydraulic oil of the engine and sets the abnormality determination value according to a corrected, estimated temperature of the fuel vapor.

5. The abnormality detection device for an engine system according to claim 1, wherein:

the intake air temperature sensor is fitted to the intake pipe at a portion where the intake pipe and the fuel vapor pipe are connected.

* * * * *